(12) United States Patent
Perego

(10) Patent No.: US 9,199,343 B2
(45) Date of Patent: Dec. 1, 2015

(54) APPARATUS AND METHOD FOR THE SURFACE TREATMENT OF OBJECTS

(71) Applicant: TAPEMATIC S.P.A., Ornago (IT)

(72) Inventor: Luciano Perego, Merate (IT)

(73) Assignee: TAPEMATIC S.P.A., Ornago (IT)

( * ) Notice: Subject to any disclaimer, the term of this patent is extended or adjusted under 35 U.S.C. 154(b) by 0 days.

(21) Appl. No.: 14/104,153

(22) Filed: Dec. 12, 2013

(65) Prior Publication Data

US 2015/0033964 A1 Feb. 5, 2015

(30) Foreign Application Priority Data

Aug. 2, 2013 (IT) .............................. MI2013A1318

(51) Int. Cl.
*B41F 17/00* (2006.01)
*B23P 9/00* (2006.01)
*B41J 3/407* (2006.01)

(52) U.S. Cl.
CPC . *B23P 9/00* (2013.01); *B41J 3/4073* (2013.01)

(58) Field of Classification Search
CPC ...... B65D 5/4216; B65D 41/00; B41F 17/08; B41F 17/16; B41P 2217/62; B41P 2217/61; B41P 2219/40; B41M 1/40; B23P 9/00; B41J 3/4073
See application file for complete search history.

(56) References Cited

U.S. PATENT DOCUMENTS

| 3,796,718 | A | * | 3/1974 | Benford, Jr. et al. | ......... | 523/170 |
| 3,960,073 | A | * | 6/1976 | Rush | ............... | 101/40 |
| 2009/0133593 | A1 | * | 5/2009 | Till | ............... | 101/35 |

* cited by examiner

*Primary Examiner* — Matthew G Marini
(74) *Attorney, Agent, or Firm* — Pearne & Gordon LLP

(57) ABSTRACT

An apparatus (1) for the surface treatment of objects (2), comprising a drum (3) having a peripheral zone (3*b*); a plurality of gripping elements (4) disposed in the peripheral zone (3*b*) of the drum (3) and configured to each receive a respective object (2) to be treated; printing means (5) associated with the drum (3) and comprising at least one print head (6), the head (6) being positionable in front of the gripping elements (4) in order to print on an object (2); the printing means (5) are configured to print on a lateral surface (2*a*) and on a base surface (2*b*) of the caps (2) on the same drum (3).

23 Claims, 7 Drawing Sheets

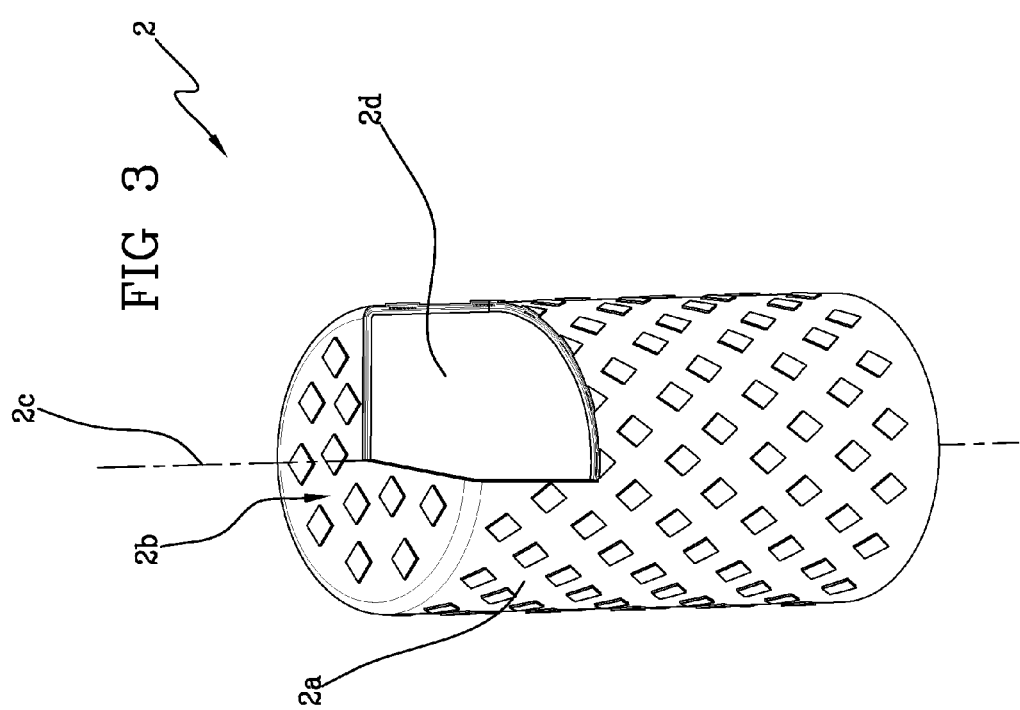

APPARATUS AND METHOD FOR THE SURFACE TREATMENT OF OBJECTS

FIELD OF THE INVENTION

The present invention relates to an apparatus and a method for the surface treatment of objects.

DESCRIPTION OF RELATED ART

The term "surface treatment" refers in particular to printing, with the possible preparation and finishing of the object's surface.

"Object" means any three-dimensional element comprising at least a lateral surface and a base surface that are differently oriented relative to each other, and in which at least the lateral surface extends around an axis of extension of the object. An example of objects that may be treated with the apparatus according to the present invention is three-dimensional hollow objects, represented for example by caps, preferably, but not necessarily, bottle caps.

The shape of the objects is preferably axisymmetric, for example cylindrical or conical (truncated cone-shaped) with a circular base. In this case the axis of extension defines the axis of symmetry, the lateral surface is given by the surface wrapped around the axis of extension and the base surface is given by the base of the cylinder or of the truncated cone-shaped body. One alternative can envisage a shape with an oval base. Potentially, prismatic objects can be envisaged, for example with a square or rectangular base.

Decorations or the like are known to be reproduced on the surface of such objects to enhance their aesthetic quality. Such decorations are often in relief, both in a visual and tactile sense, and the object is often made of metal material, so that the cap has an appearance of particular quality and it is possible to obtain such decorations by embossing the surface of the object itself.

The automatic actions the object can undergo during packaging, though specifically calibrated at the stage of design of the automatic machine so as to avoid damage, can sometimes damage the relief decorations on the objects.

To avoid this drawback, an alternative method has been provided for obtaining these decorations; it envisages applying printing ink on some portions of the lateral wall and/or top of the object to reproduce a predetermined motif. The step of applying printing ink can take place with any printing technique, for example inkjet printing, screen printing, pad printing, flexographic printing or offset printing. Preferably, this step is carried with a digital printing technique, i.e. without the use of plates, frames or the like, because printing takes place directly via a graphic file processed by the printing device (print heads). Printing can be followed by a metallization step with a process of applying a fine metal layer on the surface.

With the apparatus constructed according to the prior art, the equipment used to apply printing ink on some portions of the lateral wall is not suitable for applying printing ink on some portions of the base wall of the object. It is thus necessary to provide for two distinct apparatus if it is desired to decorate both the lateral surface and the base surface.

This results in the generation of an unnecessary redundancy, a slowing in the production line, a reduced quality of the finished products and more in general poor reliability.

SUMMARY OF THE INVENTION

In this context, the technical task at the basis of the present invention is to propose an apparatus and a method for the surface treatment of objects which overcomes the above-mentioned drawbacks of the prior art.

In particular, it is an object of the present invention to provide an apparatus and a method for the surface treatment of objects which show improved reliability.

The stated technical task and specified objects are substantially achieved by an apparatus and a method for the surface treatment of objects comprising the technical features set forth in one or more of the appended claims. The dependent claims correspond to possible embodiments of the invention.

In particular, the printing means, associated with the drum, are capable of printing on a base surface and on a lateral surface of the cap. Consequently, the duplication deriving from the introduction of another apparatus in the production line is no longer necessary. Reliability is thus greatly improved, since the number of components that can potentially break is halved.

BRIEF DESCRIPTION OF THE DRAWINGS

Additional features and advantages of the present invention will be more clearly apparent from the approximate and hence non-limiting description of a preferred but not exclusive embodiment of an apparatus for the surface treatment of objects, as illustrated in the appended drawings, in which:

FIG. 3 is a perspective view with some parts cut away to better illustrate others of a cap produced with an apparatus in accordance with the present invention.

DETAILED DESCRIPTION OF PREFERRED EMBODIMENTS OF THE INVENTION

Figure 1A:
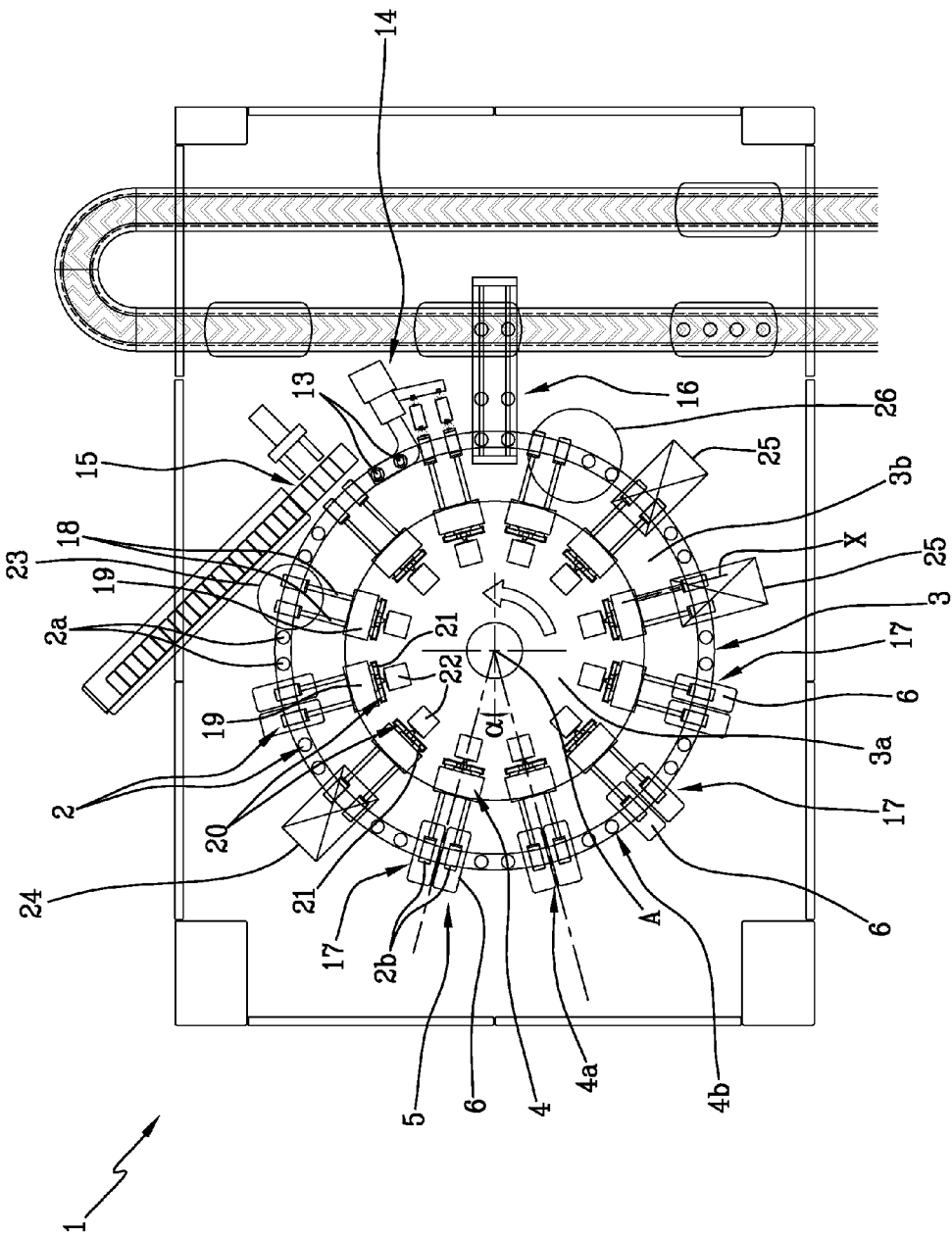
FIGS. 1a, 1b, 1c and 1d are views from above of respective variant embodiments of an apparatus for the surface treatment of objects according to the present invention.

With reference to the appended figures, 1 indicates an apparatus for the surface treatment of objects 2 according to the present invention.

The object 2 can be produced by means, for example, of a prismatic element having at least a lateral wall defining a lateral surface 2a and a base wall defining a base surface 2b. Preferably, the lateral wall and the base wall define an internal cavity 2d. The prismatic element is, for example, a hollow cylindrical or truncated cone-shaped body endowed with a lateral wall and a substantially flat base wall. It should be noted that other shapes are suited to the purpose, such as, for example, prisms with a quadrangular cross section and with an oval cross-section.

In general, the lateral surface 2a and the base surface 2b can be oriented differently relative to each other. In particular, at least the lateral surface 2a extends around an axis of extension 2c of the object 2. Preferably, at least the axis of extension 2c is a main axis of extension, i.e. it defines the direction along which the object has the largest dimension.

The object 2 can be produced in any manner, that is to say, with any technique. Moreover, the object 2 can be produced with any material, preferably metal or plastic.

By way of example, the object 2 can be obtained by drawing a sheet (if it is made of metal) or by moulding (if it is made of plastic material).

In particular, the object 2 is a cap, preferably a bottle cap.

The apparatus 1 comprises a drum 3. The drum 3 has an axisymmetric shape, that is to say, it has a central axis "A". In particular, the drum 3 has a circular plan shape. The drum 3 has a preferably flat surface 3a. The surface 3a defines a preferably horizontal plane. The central axis "A" is preferably perpendicular to the surface 3a of the drum 3. In other words, the central axis "A" is disposed along a vertical direction.

In greater detail, the drum 3 has a peripheral zone 3b. In particular, the peripheral zone 3b is a circular crown disposed around the central axis "A".

The drum 3 is in particular a rotating one, that is to say, it is designed to be set in rotation around its central axis "A". The manner of rotation of the drum 3 will be better illustrated further below in the present description.

The apparatus 1 comprises a loading station 15 disposed along the peripheral zone 3b of the drum 3, in which the objects 2 are loaded. The apparatus 1 further comprises an unloading station 16, likewise disposed along the peripheral zone 3b of the drum 3.

Between the loading station 15 and unloading station 16 the apparatus 1 comprises one or more printing stations 17, 17a, 17b preferably situated along the peripheral zone 3b of the drum 3. In particular, the rotation of the drum 3 carries the objects 2 from the loading station 15 to the unloading station 16, passing them through the printing stations 17, 17a, 17b.

In greater detail, the apparatus 1 comprises a plurality of gripping elements 4 disposed on the drum 3, preferably in the peripheral zone 3b of the drum 3.

The gripping elements 4 are configured to each receive a respective object 2 to be treated.

The gripping elements 4 comprise at least one horizontal gripping element 4a, or first gripping element, configured to receive and retain an object 2 in a first position in which it is disposed with its axis of extension 2c preferably horizontal. In particular, there is provided a plurality of horizontal gripping elements 4a radially disposed relative to the drum 3. Preferably, the horizontal gripping elements 4a are evenly distributed around the central axis A with a constant angular pitch equal to a first angle α.

With reference to the illustrated embodiments, a plurality of horizontal gripping elements 4a are provided.

Figure 1B:
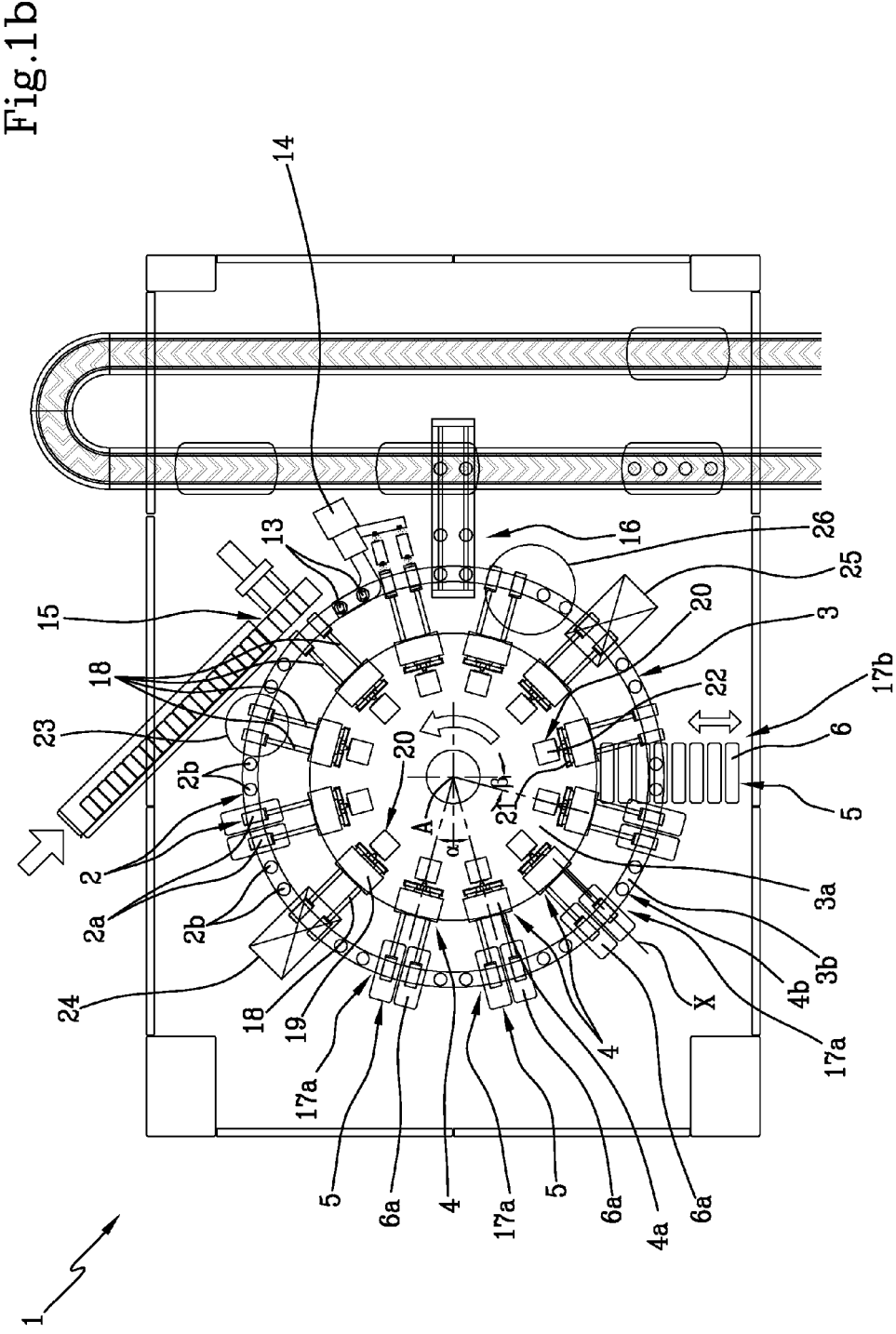

With reference to the embodiments illustrated in FIGS. 1a and 1b, the gripping elements 4 further comprise at least one vertical gripping element 4b, or second gripping element, configured to receive and retain an object 2 in a second position, different from the first, in which it is disposed with its axis of extension 2c preferably vertical. In particular, a plurality of vertical gripping elements 4b are provided, in a number identical to that of the plurality of horizontal gripping elements 4a. The vertical gripping elements 4b are evenly distributed around the central axis A and alternate with the horizontal gripping elements 4a.

It should be noted that in the embodiments shown in FIGS. 1a and 1b, every vertical gripping element 4b comprises a seat 13 configured to retain an object 2 in the second position, preferably disposed vertically. The seat 13 is provided in particular along the peripheral zone 3b of the drum 3. Moreover, the seat 13 is designed to pass through the aforementioned printing station 17, 17a, 17b as a result of the rotation of the drum.

In these embodiments, the apparatus 1 comprises a switching member 14 associated with the gripping elements 4 and the drum 3. The changeover member is configured to transfer an object 2 from the horizontal gripping element 4a to the vertical gripping element 4b or vice versa.

With reference to the embodiments illustrated in FIGS. 1a and 1b, each horizontal gripping element 4a receives an object 2 in the loading station 15 and each vertical gripping element 4b releases it in the unloading station 16. Alternatively, the opposite can be envisaged.

Figure 1C:
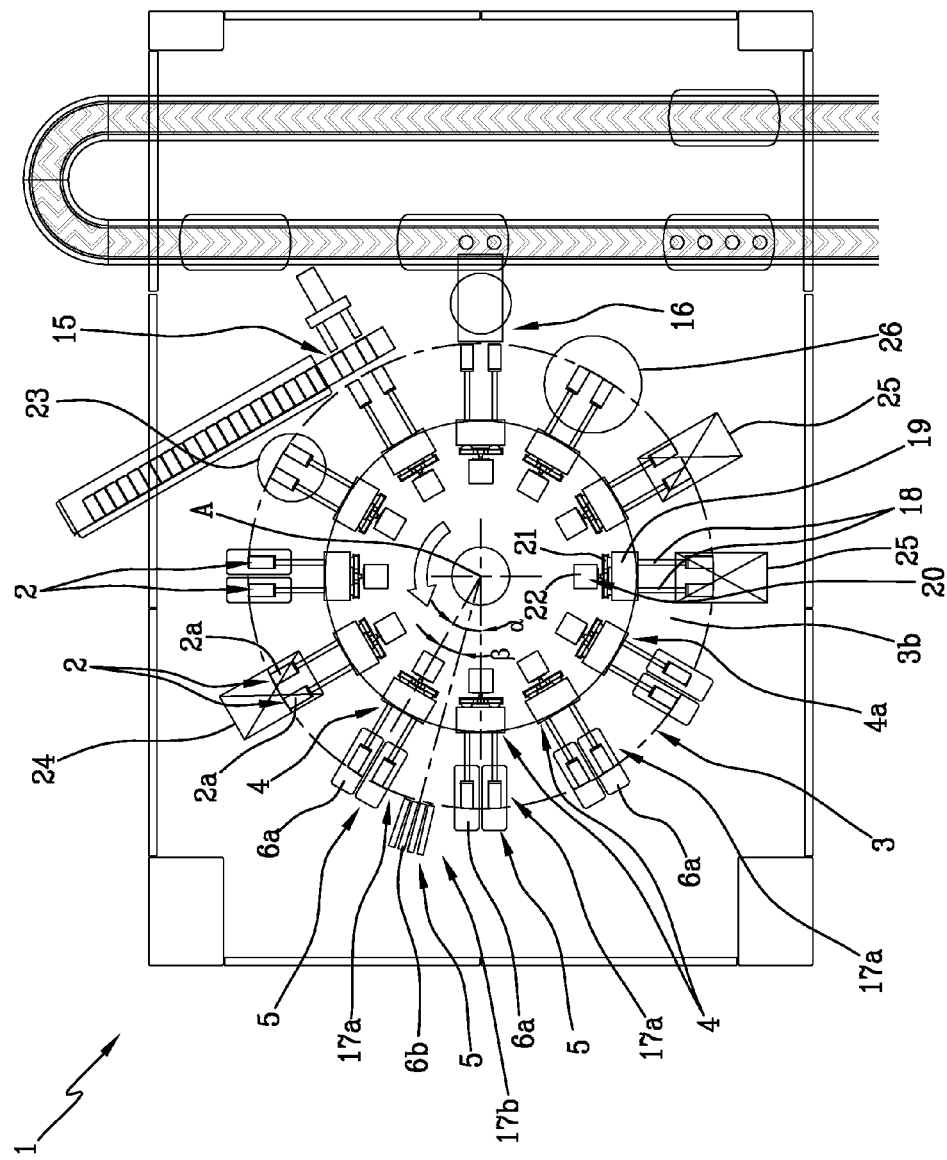
Figure 1D:
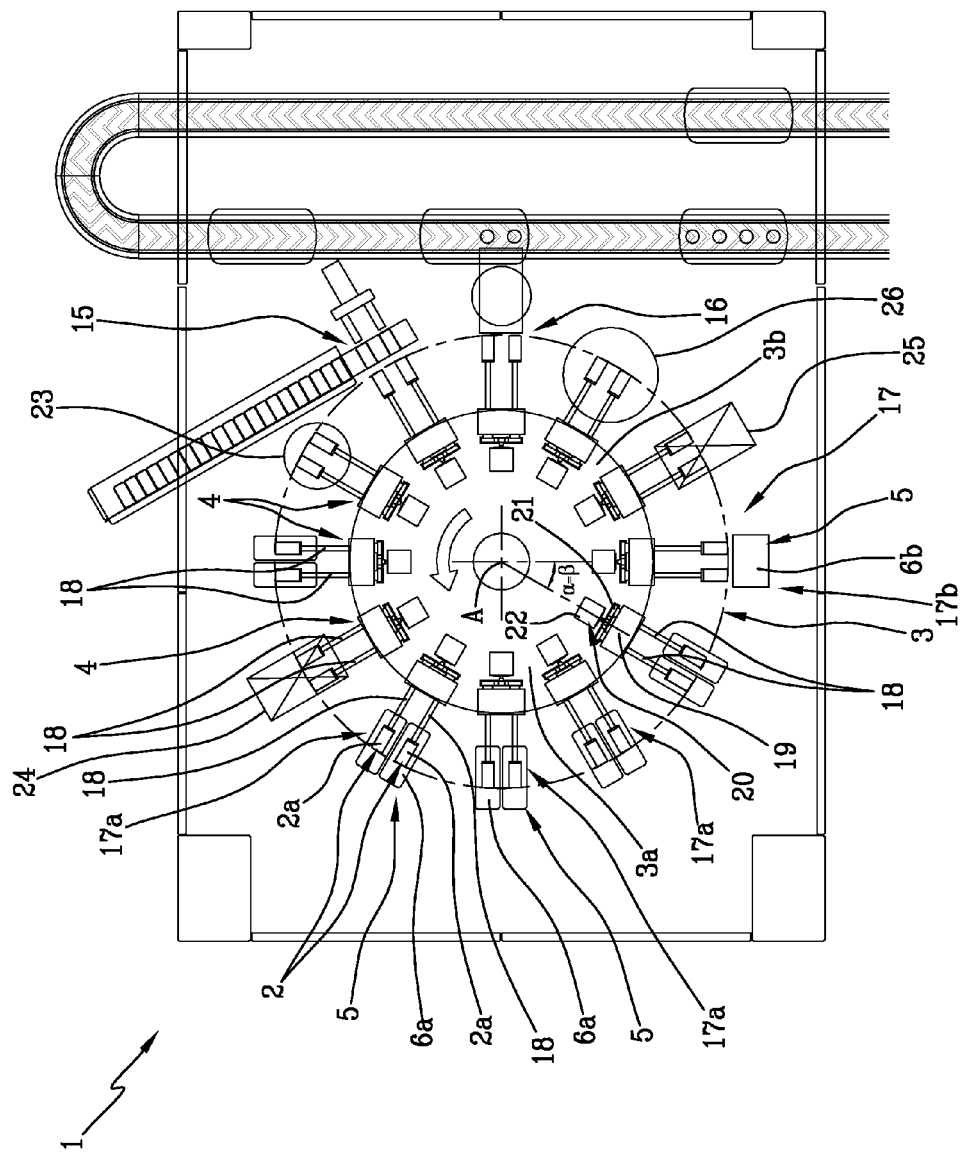

With reference to the embodiments illustrated in FIGS. 1c and 1d, each gripping element 4 (in particular each horizontal gripping element 4a) receives an object 2 in the loading station 15 and releases it in the unloading station 16.

In detail, a gripping element 4, in particular a horizontal gripping element 4a, comprises a main body 19. A spindle 18, connected to the main body 19, is capable of receiving and retaining the object 2. The object 2 is in particular placed on one end of the spindle 18. Preferably, the spindle 18 has a longitudinal axis of extension lying parallel to the surface of the drum.

The object 2 is placed on one end of the spindle 18, disposed along the longitudinal axis of extension of the spindle 18 coinciding with the axis of extension 2c. In the embodiments illustrated, during the printing step, the spindle 18 is set in rotation around its longitudinal axis of extension, thus defining a respective axis of rotation X, so that it is possible to print on the lateral surface 2a of the object 2.

In other words, means 20 are provided to activate the rotation of the spindle 18 so as to set the object 2 in rotation around its axis of extension 2c. For example, the activating means 20 can comprise a motor 22, preferably electric, and mechanical transmission members 21 operatively placed between the motor and the spindle 18. By way of example, the mechanical transmission members 21 can be a chain and a pair of gears connected respectively to the motor and spindle 18.

The apparatus 1 further comprises printing means 5 operatively associated with the drum 3 and operating in the printing stations 17, 17a, 17b. The printing means 5 comprise at least one print head 6, 6a, 6b. By way of example, the print head can be an inkjet print head. This print head can be positioned in front of the gripping elements 4 in a printing station 17, 17a, 17b in order to print a specific motif on the lateral surface 2a and/or base surface 2b of an object 2 associated with the respective gripping element 4.

The printing means 5 are in particular disposed and configured to print on the lateral surface 2a and/or base surface 2b of the objects 2. In greater detail, this function can be performed by one or more heads, according to the modes described below. In other words, each head can be disposed and configured to print only on the lateral surface 2a (print head 6a), only on the base surface 2b (additional print head 6b), or on both (print head 6). Each printing station 17, 17a, 17b can comprise one or more print heads. In particular, one or more print heads 6 define a printing station indicated with the reference 17, one or more print heads 6a define a printing station indicated with the reference 17a and one or more print heads 6b define a printing station indicated with the reference 17b.

In particular, if there is provided at least one print head 6a, disposed and configured to print only on the lateral surface 2a and an additional print head 6b disposed and configured to print only on the base surface 2b, the objects 2 can always be maintained in the same position relative to the drum 3, preferably associated with the horizontal gripping elements 4a, and the printing of both surfaces of the same object can take place in a single rotation of the drum 3.

Preferably, if the horizontal gripping elements 4a are evenly distributed around the central axis A with a constant angular pitch equal to a first angle α and there are provided two or more print heads 6, 6a forming two or more different printing stations 17, 17a, such printing stations will be radially disposed around the axis A so that all the printing stations can be occupied simultaneously. If there is provided at least one additional print head 6b defining a printing station 17b, a second angle β defined between a print head 6a (printing station 17a) which is disposed and configured so as to print a specific motif on the lateral surface 2a of the object 2 and the additional print head 6b (printing station 17b) disposed and configured so as to print a specific motif on the base surface 2b of the object will be different from (in particular smaller than) the first angle α.

Alternatively, the first angle α and the second angle β are equal.

If there are provided print heads 6 which are disposed and configured to print both on the lateral surface 2a and on the base surface 2b, the objects 2 can be disposed in different positions relative to the drum 3 during the printing on each surface, preferably associated respectively with the horizontal gripping elements 4a and the vertical gripping elements 4b. In this case, the printing of both surfaces on the same object preferably takes place following two rotations of the drum 3.

Preferably, the print head can be placed above the gripping elements 4, in particular above the peripheral zone 3b of the drum 3, so that the objects 2 can pass beneath the print head itself. In this manner, the ink jet exiting the print head will follow a substantially vertical trajectory.

Alternatively, the print head can be disposed externally relative to the drum 3, for example radially external relative to the gripping elements. In such a case, the ink jet will follow a substantially horizontal trajectory from the print head to the object.

In further detail, the printing means 5 operate by means of a relative movement between the object 2 and the print head. In particular, there are provided drive means configured to generate a relative motion between the object 2 associated with the respective gripping element 4 and the print head during printing on the lateral surface 2a and/or on the base surface 2b of an object 2.

The drive means can comprise means 11 for moving the print head which can be actuated during printing in particular on the base surface 2b.

In addition or alternatively, the drive means can comprise means 12 for advancing the drum 3 which can be actuated during printing in particular on the base surface 2b. In this case, the drum advances due to the rotation thereof and the print head is preferably fixed relative to the central axis "A" of the drum 3. The same advancing means 12 can also be used to pass the objects from one station to the next.

In addition or alternatively, another variant embodiment envisages that the drive means comprise the means 20 for activating the rotation of the spindle 18, which can be actuated during printing in particular on the lateral surface 2a.

All these operating modes can be combined together depending on the operating requirements, giving rise to variants of the invention which are not represented in the appended figures or are not explicitly described.

Finally, it should be noted that in the preferred embodiment each gripping element 4 can be configured to support at least two objects 2. In this case, the print head will be configured to print simultaneously on at least two objects 2 carried by a single gripping element 4. In other words, the horizontal gripping element 4a will comprise a pair of spindles 18. Preferably, the spindles 18 are connected to a single motor 22 by means of the aforementioned mechanical transmission members 21.

With reference to the embodiments illustrated in FIGS. 1a and 1b, each vertical gripping element 4b can be configured to support at least two objects 2. In this case, the print head will be configured to print simultaneously on at least two objects 2 carried by a single gripping element 4. In other words, the vertical gripping element 4b will comprise two seats 13, each configured to retain an object 2 in the second position, preferably disposed vertically.

In these embodiments, the apparatus 1 comprises a changeover member 14 associated with the gripping elements 4 and the drum 3. The changeover member is configured to transfer two objects 2 from the horizontal gripping element 4a to the vertical gripping element 4b or vice versa.

The apparatus 1 further comprises a control unit 7. In general, it should be noted that in the present context and in the subsequent claims, the control unit 7 is presented as divided into distinct functional modules (memory modules or operating modules) solely for the purpose of describing the functions thereof in a clear and complete manner.

In reality, the control unit 7 can consist of a single electronic device, duly programmed to carry out the functions described, and the different modules can correspond to hardware entities and/or routine software belonging to the programmed device.

Alternatively or in addition, the functions can be performed by a plurality of electronic devices over which the aforesaid functional modules can be distributed.

The control unit 7 can rely on one or more processors to execute the instructions contained in the memory modules. Furthermore, the aforesaid functional modules can be distributed over different local or remote computers based on the architecture of the network they reside in.

In detail, the control unit 7 is operatively connected to the printing means 5 and/or to the drive means and is programmed to control printing, on the same drum 3, both on the lateral surface 2a and base surface 2b of the objects 2.

Figure 2:
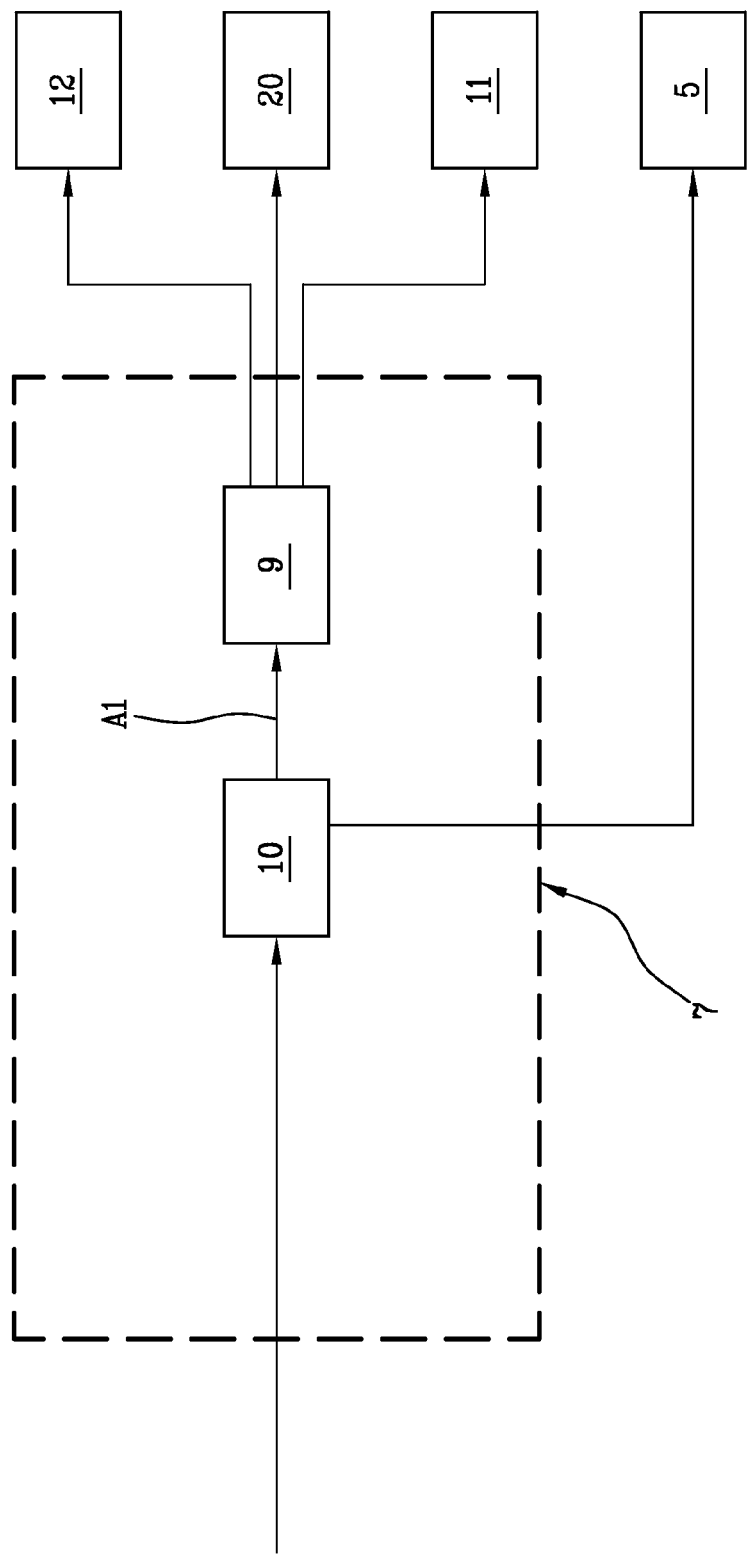
FIG. 2 is a block diagram representing the operation of the apparatus of FIGS. 1a, 1b, 1c and 1d.

In accordance with a possible embodiment, for illustrated example in FIG. 2, the control unit 7 comprises an actuation module 9 configured to activate the drive means and generate a relative movement between the print head 6, 6a, 6b and the object 2 associated with the respective gripping element 4 that is passing in front of the print head. This activation is performed also based on the position and/or orientation of the objects 2 at a printing station 17.

The control unit 7 can further comprise a processing module 10 configured to send the actuation module 9 a signal A1 representing a relative movement between the print head 6, 6a, 6b and the object 2 associated with the respective gripping element 4. The signal A1 is sent also based on the position and/or orientation of the objects 2 at a printing station 17.

Furthermore, the processing module 10 is configured to control the printing means 5 so that they carry out the printing based on the position and/or orientation of the objects 2 at a printing station 17, 17a, 17b.

Figure 2A:
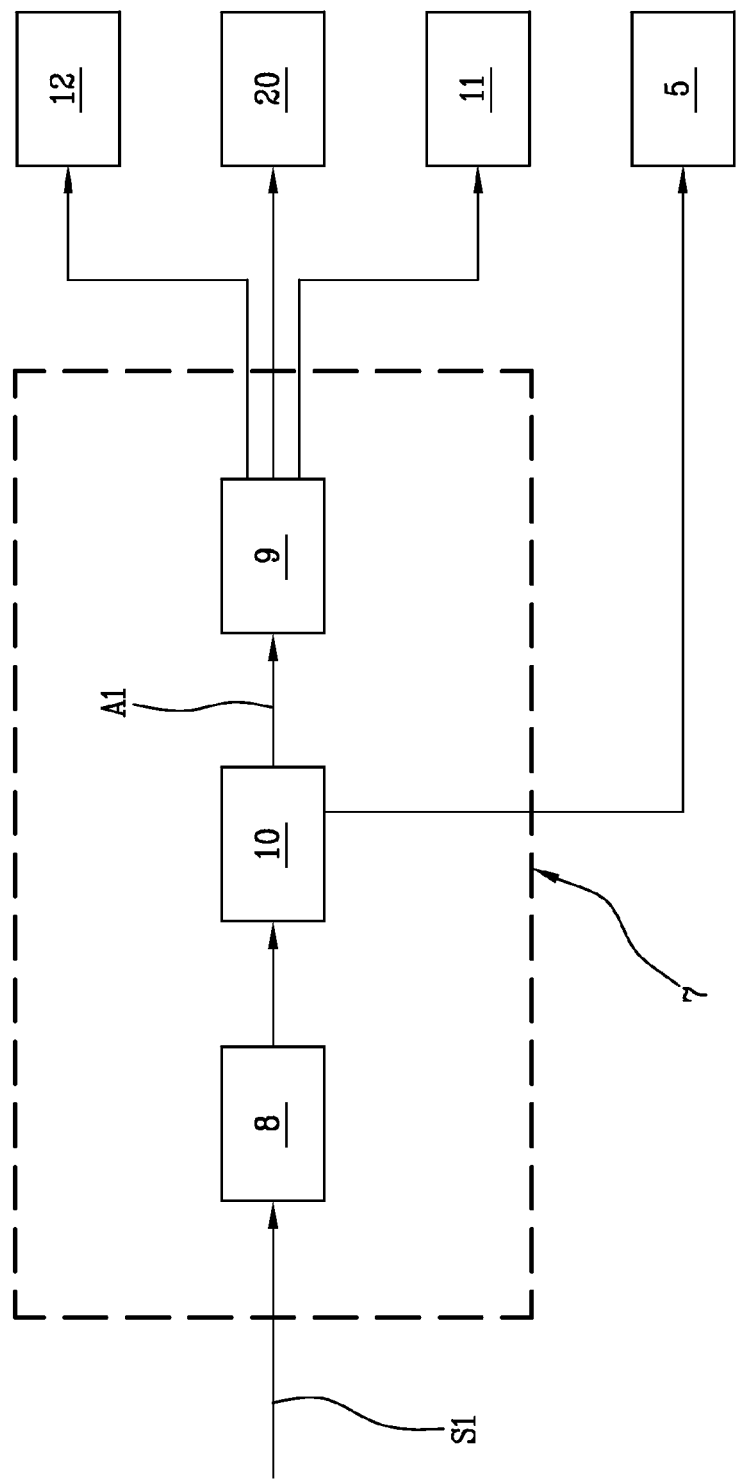
FIG. 2a is a block diagram which is alternative to the one in FIG. 2.

According to a possible alternative embodiment, illustrated in FIG. 2a, the control unit 7 can comprise a sensor module 8 configured to detect the passage of the base surface 2b or lateral surface 2a of the object 2 in front of the print head 6, 6a, 6b.

The sensor module 8 is configured to acquire a signal S1 representing the presence of an object 2 associated with a respective gripping element 4 at a printing station 17 and send the signal S1 to the processing module 10.

If the print head is movable, the actuation module 9 is configured to actuate the means 11 for moving the print head during printing in particular on the base surface 2b. In particular, the control unit 7 is configured so as to control the moving of the means 11 for moving the print head and the printing means 5 in synchrony so as to adapt the relative movement between the print head and the object.

If the print head is fixed relative to the drum 3, or in addition to the movement of the print head, the actuation module 9 controls the forward rotation of the drum 3 via the means 12 for advancing the drum 3. In particular, the actuation module 9 is configured to actuate the advancing means 12 during printing in particular on the base surface 2b. In particular, the control unit 7 is configured so as to control the means 12 for advancing the print head and the printing means 5 in synchrony so as to adapt the relative movement between the print head and the object.

In addition and/or as an alternative to the above, the actuation module 9 is configured to actuate the means 20 for activating the rotation of the spindle 18 during printing in particular on the lateral surface 2a. In particular, the control unit 7 is configured so as to control the means 20 for activating the rotation of the spindle 18 and the printing means 5 in synchrony so as to adapt the relative movement between the print head and the object.

More in general, the control unit 7 can be set up to function according to two or more of these modes, of which some examples of application are provided hereunder with reference to FIGS. 1a-1d.

With reference to FIG. 1a, the gripping elements 4 comprise at least one horizontal gripping element 4a and at least one vertical gripping element 4b. In particular, the apparatus 1 of FIG. 1a comprises a plurality of horizontal gripping elements 4a radially disposed relative to the drum 3 and evenly distributed around the central axis A with a constant angular pitch equal to the first angle α and an identical plurality of vertical gripping elements 4b evenly distributed around the central axis A and alternating with the horizontal gripping elements 4a.

In the first position the object 2 is disposed with its axis of extension 2c horizontal and radial relative to the drum 3, while in the second position the object 2 is disposed with its axis of extension 2c vertical.

The printing means 5 comprise at least one print head 6 which is disposed and configured so as to print a specific motif on the lateral surface 2a of the object 2 disposed in the first position. In particular, two or more printing stations can be provided, each suitable for applying a given colour that is the same as or different from that of the other printing stations. In the illustrated example, every printing station comprises two print heads.

In the embodiment of FIG. 1a, the same print head 6, disposed and configured so as to print a specific motif on the lateral surface 2a of the object 2 disposed in the first position, is moreover disposed and configured so as to print a specific motif on the base surface 2b of the object 2 disposed in the second position.

In addition to the above, the apparatus 1 can further comprise a surface treatment station 23 located upstream of the printing stations 17, according to the direction in which the drum 3 advances, and/or an intermediate drying station 24 located between the printing stations 17 so as to dry a given colour and/or one or more final drying stations 25 located downstream of the printing stations 17, according to the direction in which the drum 3 advances, and/or a quality control station 26 located downstream of the complete treatment carried out on the objects, according to the direction in which the drum 3 advances.

During use, the objects are loaded on the horizontal gripping elements 4a at the loading station 15.

The rotation of the drum 3 carries the objects 2 loaded on the horizontal gripping elements 4a from the loading station 15 to the changeover member 14, passing them through the printing stations 17 and any other stations provided for.

The changeover member 14 transfers the objects 2 from the horizontal gripping elements 4a to the vertical gripping elements 4b and the rotation of the drum 3 carries the objects 2 loaded on the vertical gripping elements 4b from the changeover member 14 to the unloading station 16, passing them through the printing stations 17 and any other stations provided for. In this case, during the same rotation of the drum 3, the control unit 7 controls both the printing on the lateral surface 2a and printing on the base surface 2b that is performed on different objects disposed in different positions.

When one or more objects 2 associated with the horizontal gripping elements 4a are disposed at a printing station 17, the control unit 7 controls printing on the lateral wall 2a. In particular, the actuation module 9 is configured to actuate the means 20 for activating the rotation of the spindle 18. Preferably, the drum 3 is stationary and each print head 6 is fixed relative to a central axis A of the drum 3 during printing on the lateral wall 2a.

During the transfer of at least one object 2 associated with a horizontal gripping element 4a toward a subsequent printing station 17, at least one different object 2 associated with a vertical gripping element 4b meets a printing station 17 that has just finished printing on the lateral surface 2a of the object immediately preceding it.

The control unit 7 controls printing on the base wall 2b of one or more objects associated with vertical gripping elements 4b. In particular, the actuation module 9 is configured to actuate at least the means 12 for advancing the drum 3 during printing on the base surface 2b in the second position. Preferably, each print head 6 is fixed relative to a central axis A of the drum 3 during printing on the base wall 2b and the seat 13 is configured so as to maintain the object associated with it fixed relative to the drum 3.

In accordance with a possible variant, not illustrated, means 11 for moving the print head 6 can be provided and the actuation module 9 is configured to actuate the moving means 11, in particular during printing on the base surface 2b of the object disposed in the second position. In particular, the means 11 for moving the print head 6, if present, can be configured to move the print head itself horizontally.

With reference to FIG. 1b, the structure of the apparatus is substantially analogous to that of FIG. 1, but with different printing means 5 and hence a different control by the control unit 7.

The printing means 5 comprise at least one print head 6a which is disposed and configured so as to print a specific motif on the lateral surface 2a of the object 2, disposed in the first position, and at least one additional, different print head 6b which is disposed and configured so as to print a specific motif on the base surface 2b of the object 2 disposed in the second position.

In particular, there are provided several printing stations 17a in which one or more print heads 6a are disposed and configured so as to print a specific motif on the lateral surface 2a of the object 2 and at least one printing station 17b in which one or more additional print heads 6b are disposed and configured so as to print a specific motif on the base surface 2b of the object 2. The angles α and β are indicated in the figure and are preferably such that all the printing stations are simultaneously occupied. In particular, the angle β is preferably equal to half of α.

When one or more objects 2 associated with the horizontal gripping elements 4a are disposed at a printing station 17a, the control unit 7 controls printing on the lateral wall 2a with reference to the print head 6a.

In particular, the actuation module 9 is configured to actuate the means 20 for activating the rotation of the spindle 18.

Preferably the drum 3 is stationary and the print head 6a is fixed relative to a central axis A of the drum 3 during printing on the lateral wall 2a.

Whereas at least one object 2 associated with a horizontal gripping element 4a is disposed in the printing station 17a comprising at least one print head 6a, at least one different object 2 associated with a vertical gripping element 4b is disposed in a printing station 17b comprising at least one additional print head 6b.

Preferably, the additional print head 6b is movable relative to a central axis A of the drum 3 during printing on the base wall 2b and the seat 13 is configured so as to maintain the object associated with it fixed relative to the drum 3. In particular, the means 11 for moving the print head 6b are configured so as to move the additional print head itself horizontally. The control unit 7 controls printing on the base wall 2b of one or more objects associated with the vertical gripping elements 4b. In particular, the actuation module 9 is configured to actuate the means 11 for moving the additional print head 6b during printing on the base surface 2b.

In accordance with a possible variant, not illustrated, the vertical gripping elements 4b are configured so as to move the object 2 relative to the additional print head 6b, so that the actuation module 9 is configured to activate the movement of the object relative to the additional print head 6b during printing on the base surface 2b in the second position.

With reference to FIGS. 1c and 1d, the structure of the apparatus 1 is similar to the one previously described, differing therefrom in particular due to the absence of the vertical gripping elements. In fact, the gripping elements 4 comprise only horizontal gripping elements 4a, so that the objects 2 are always associated with the same gripping element both during printing on the lateral surface 2a and during printing on the base surface 2b.

In both cases there is provided at least one additional, different print head 6b disposed and configured so as to print a specific motif on the base surface 2b of the object 2 disposed in the first position. In both cases, therefore, two or more printing stations 17a and at least one printing station 17b are provided.

With reference to FIG. 1c, the additional print head 6b is fixed relative to the axis A and the actuation module 9 is configured to actuate the means 12 for advancing the drum 3 during printing on the base surface 2b. The first angle α defined between two consecutive horizontal gripping elements 4a is different from the second angle β. Preferably, β is equal to half of α. The first angle α is preferably such that all the printing stations 17a are simultaneously occupied.

With reference to FIG. 1d, the additional print head 6b is movable, in particular vertically, relative to the axis A and the actuation module 9 is configured to actuate the means 11 for moving the additional print head 6b during printing on the base surface 2b. The first angle α defined between two consecutive horizontal gripping elements 4a is equal to the second angle β. The angles α and β are indicated in the figure and are preferably such that all the printing stations are simultaneously occupied.

According to a further aspect, the present invention relates to a method for the surface treatment of the objects 2 which envisages:
readying an object 2, holding it in a first position relative to a drum 3 suitable for rotating around a central axis A;
setting the drum 3 in rotation so that the object reaches at least one printing station 17, 17a, 17b,
generating a relative motion between the object 2 and at least one print head 6, 6a, 6b of the printing station during printing on the lateral surface 2a and/or on the base surface 2b,
controlling the printing means 5 comprising the print head 6, 6a, 6b and the relative motion so as to control, on the same drum 3, printing on the lateral surface 2a and base surface 2b.

In particular, it can be envisaged that the objects 2 are maintained in the same position relative to the drum 3 and printing on the lateral surface 2a and base surface 2b is controlled on the same drum 3 in a single rotation of the drum 3.

Alternatively, it is possible to modify the position of the objects 2 relative to the drum 3 between the first position and the second position. In this case it is possible to control, on the same drum 3, printing on the lateral surface 2a and base surface 2b in two rotations of the drum 3 using the same print head 6 to print on the lateral surface 2a and base surface 2b, or in one rotation of the drum 3 using different print heads 6a, 6b to print on the lateral surface 2a and base surface 2b.

The base surface 2b can be printed on during the passage thereof between two adjacent printing stations suitable for printing on the lateral surface 2a, or vice versa. In this case it is advantageous to use an advancing motion of the drum 3 to generate a relative motion between the object 2 and the print head 6, 6a, 6b during printing on the lateral surface 2a and/or on the base surface 2b.

Alternatively, it is possible to print on the base surface 2b and the lateral surface 2a simultaneously.

The invention claimed is:

1. An apparatus (1) for the surface treatment of objects (2), each comprising at least a lateral surface (2a) and a base surface (2b) that are differently oriented relative to each other, wherein at least said lateral surface (2a) extends around an axis of extension (2c) of said object (2),
said apparatus comprising:
a drum (3) suitable for rotating around a central axis (A);
a plurality of gripping elements (4) disposed on said drum (3) and configured to each receive and retain a respective object (2) to be treated;
printing means (5) operatively associated with said drum (3) and comprising at least one print head (6, 6a, 6b), said print head (6, 6a, 6b) being positionable in front of said gripping elements (4) at a printing station (17, 17a, 17b) in order to print a specific motif on the lateral surface (2a) and/or on the base surface (2b) of an object (2) associated with a respective gripping element (4);
drive means configured to generate a relative motion between said object (2) associated with the respective gripping element (4) and said at least one print head (6, 6a, 6b) during printing on said lateral surface (2a) and/or said base surface (2b) of an object (2),
a control unit (7) operatively connected to said printing means (5) and/or said drive means, said control unit (7) being programmed to control, on the same drum (3), both printing on the lateral surface (2a) and the base surface (2b) of said objects (2),
wherein said gripping elements (4) comprise a plurality of horizontal gripping elements (4a) which are radially disposed relative to said drum (3) and evenly distributed around said central axis (A) with a constant angular pitch equal to a first angle (α) and an identical plurality of vertical gripping elements (4b) evenly distributed around said central axis (A) and alternating with said horizontal gripping elements (4a), preferably at a distance equal to half of said first angle (α).

2. The apparatus (1) according to claim 1, wherein said control unit (7) comprises an actuation module (9) configured to activate said drive means and generate a relative movement between said print head (6, 6a, 6b) and said object (2) associated with the respective gripping element (4) based on the position and/or orientation of said objects (2) at a printing station (17, 17a, 17b).

3. The apparatus (1) according to claim 2, wherein said control unit (7) comprises a processing module (10) configured to send to said actuation module (9) a signal (A1) representing a relative movement between said print head (6, 6a, 6b) and said object (2) associated with the respective gripping element (4), said signal (A1) being sent based on the position and/or orientation of said objects (2) at a printing station (17, 17a, 17b).

4. The apparatus (1) according to claim 3, wherein said control unit (7) comprises a sensor module (8) configured to detect the passage of a base surface (2a) and/or a lateral surface (2b) of said object (2) in front of said print head (6, 6a, 6b), acquire a signal (S1) representing the presence of an object (2) associated with a respective gripping element (4) at a printing station (17, 17a, 17b) and send said signal (51) to said processing module (10).

5. The apparatus (1) according to claim 2, wherein said drive means comprise means (11) for moving said print head (6, 6a, 6b) and wherein said actuation module (9) is configured to actuate said means (11) for moving said head (6) during printing in particular on said base surface (2b).

6. The apparatus (1) according to claim 2, wherein said drive means comprise means for advancing (12) said drum (3), said actuation module (9) being configured to actuate said advancing means (12) during printing in particular on said base surface (2b).

7. The apparatus (1) according to claim 6, wherein said at least one print head (6, 6a, 6b) is fixed relative to a central axis (A) of the drum (3).

8. The apparatus (1) according to claim 2, wherein at least one gripping element (4) comprises a spindle (18) suitable for rotating around a respective axis of rotation (X), said spindle (18) being configured to receive and retain said object (2), with said axis of extension (2c) coinciding with said axis of rotation (X), and wherein said drive means comprise means (20) for activating the rotation of said spindle (18) and which are suitable for setting said object (2) in rotation around the axis of extension (2c) thereof, said actuation module (9) being configured to actuate said rotation activating means (20) during printing in particular on said lateral surface (2a).

9. The apparatus (1) according to claim 2, comprising at least one additional print head (6b) which is disposed and configured so as to print a specific motif on the base surface (2b) of the object (2), said additional print head (6b) being different from said at least one print head (6a) disposed and configured so as to print a specific motif on the lateral surface (2a) of the object (2), wherein said actuation module (9) is configured to actuate said means (11) for moving said additional print head (6b) during printing on said base surface (2b).

10. The apparatus (9) according to claim 9, wherein said means (11) for moving said additional print head (6b) are configured so as to move said additional print head (6b) vertically.

11. The apparatus (1) according to claim 9, and wherein a first angle ($\alpha$) defined between two consecutive horizontal gripping elements (4a) is different from a second angle ($\beta$) defined between said at least one print head (6a) which is disposed and configured so as to print a specific motif on the lateral surface (2a) of the object (2) and the additional print head (6b) disposed and configured so as to print a specific motif on the base surface (2b) of the objects (2) retained by the horizontal gripping elements (4a).

12. The apparatus (1) according to claim 9, wherein a first angle defined between two consecutive horizontal gripping elements (4a) is equal to a second angle ((3) defined between said at least one print head (6a) which is disposed and configured so as to print a specific motif on the lateral surface (2a) of the object (2) and the additional print head (6b) disposed and configured so as to print a specific motif on the base surface (2b) of the objects (2) retained by the horizontal gripping elements (4a).

13. The apparatus (1) according to claim 2, comprising at least one additional print head (6b) which is disposed and configured so as to print a specific motif on the base surface (2b) of the object (2), said additional print head (6b) being different from said at least one print head (6a) disposed and configured so as to print a specific motif on the lateral surface (2a) of the object (2), wherein said actuation module (9) is configured to actuate said means (12) for advancing the drum (3) during printing on said base surface (2b).

14. The apparatus (1) according to claim 1, wherein at least a same print head (6), which is disposed and configured so as to print a specific motif on the lateral surface (2a) of objects (2) retained by the horizontal gripping elements (4a), is moreover disposed and configured so as to print a specific motif on the base surface (2b) of objects (2) retained by the vertical gripping elements (4b).

15. The apparatus (1) according to claim 14, wherein said control unit (7) comprises an actuation module (9) configured to activate said drive means and generate a relative movement between said print head (6, 6a, 6b) and said object (2) associated with the respective gripping element (4) based on the position and/or orientation of said objects (2) at a printing station (17, 17a, 17b),
wherein said actuation module (9) is configured to actuate means (11) for moving said print head (6) during printing on said base surface (2b) of the objects (2) retained by the vertical gripping elements (4b).

16. The apparatus (1) according to claim 15, wherein said means (11) for moving said print head (6) are configured so as to move said print head (6a) horizontally.

17. The apparatus (1) according to claim 14, wherein said control unit (7) comprises an actuation module (9) configured to activate said drive means and generate a relative movement between said print head (6, 6a, 6b) and said object (2) associated with the respective gripping element (4) based on the position and/or orientation of said objects (2) at a printing station (17, 17a, 17b),
wherein said actuation module (9) is configured to actuate means (12) for advancing the drum (3) during printing on said base surface (2b) of the objects (2) retained by the vertical gripping elements (4b).

18. The apparatus (1) according to claim 1, comprising a changeover member (14) associated with said gripping elements (4) and said drum (3) and which is configured to transfer an object (2) from said horizontal gripping element (4a) to said vertical gripping element (4b) or vice versa.

19. The apparatus (1) according to claim 1, wherein said at least one print head (6a) is disposed and configured so as to print a specific motif on the lateral surface (2a) of the object (2), said apparatus (1) further comprising at least one additional print head (6b), which is disposed and configured so as to print a specific motif on the base surface (2b) of the object (2), said additional print head (6b) being different from said at least one print head (6a), said object being constantly associated with and held by the same gripping element (4).

20. The apparatus (1) according to claim 1, wherein said control unit (7) comprises a processing module (10) which is configured to control said printing means (5) so that they perform the printing based on the position and/or the orientation of said objects (2) at a printing station (17, 17*a*, 17*b*).

21. The apparatus (1) according to claim 1, comprising a plurality of said print heads (6, 6*a*, 6*b*) located along the trajectory followed by the gripping elements (4) in the rotating motion of the drum (3) around the central axis (A), preferably in a peripheral zone (3*b*) of said drum (3), and each defining a respective printing station (17, 17*a*, 17*b*).

22. The apparatus (1) according to claim 1, wherein said print head (6, 6*a*, 6*b*) is configured to print simultaneously on at least two objects (2).

23. The apparatus (1) according to claim 1, wherein the printing means (5) are configured to print on a lateral surface (2*a*) and on a base surface (2*b*) of the objects (2) on the same drum (3).

* * * * *

UNITED STATES PATENT AND TRADEMARK OFFICE
CERTIFICATE OF CORRECTION

PATENT NO. : 9,199,343 B2
APPLICATION NO. : 14/104153
DATED : December 1, 2015
INVENTOR(S) : Luciano Perego Page 1 of 1

It is certified that error appears in the above-identified patent and that said Letters Patent is hereby corrected as shown below:

In the claims

At column 11, line 18, claim 4, please delete "(51)" and insert therefor --(S1)--.

At column 11, line 54, claim 10, please delete "apparatus (9)" and insert therefor --apparatus (1)--.

At column 11, line 58, claim 11, please delete "and".

At column 12, line 3, claim 12, please delete "((3)" and insert therefor --(β)--.

Signed and Sealed this
Twelfth Day of April, 2016

Michelle K. Lee
*Director of the United States Patent and Trademark Office*